May 14, 1940.  E. GERECKE ET AL  2,200,694
ANNULAR FUSION JOINT
Filed Sept. 16, 1938   2 Sheets-Sheet 1
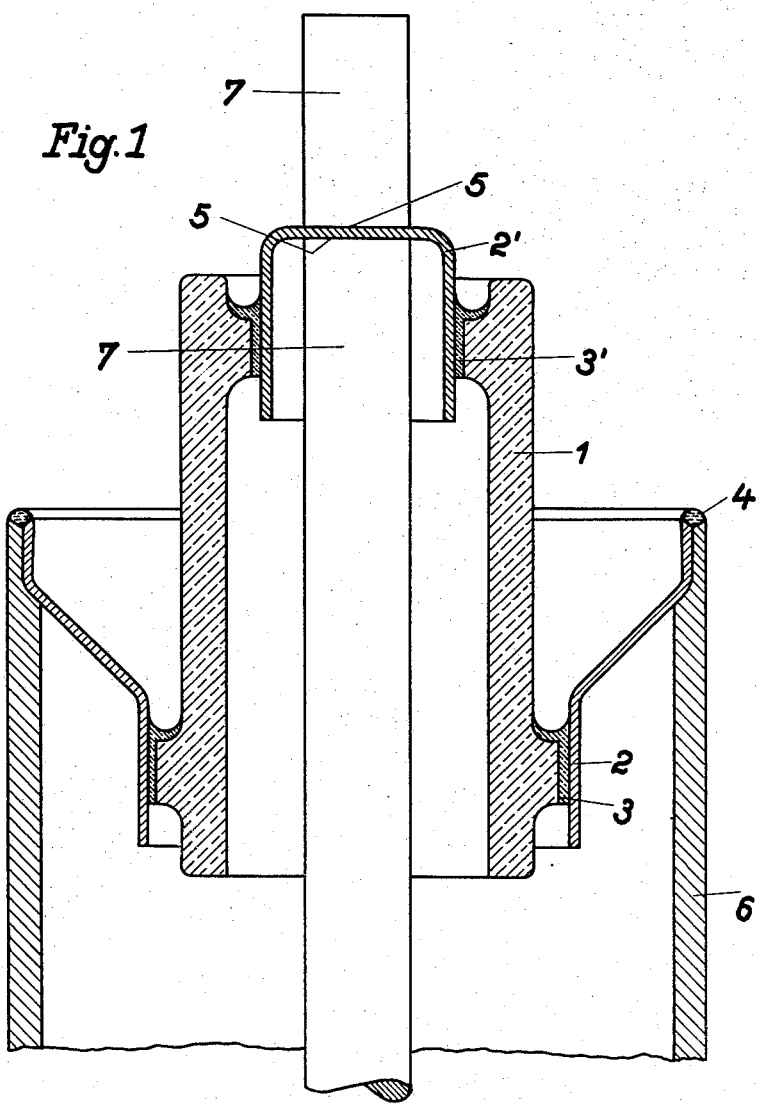
Inventors:
Eduard Gerecke,
Otto Deutschbein,
Werner Schulze,
Bailey L Carson
Attorneys May 14, 1940.  E. GERECKE ET AL  2,200,694
ANNULAR FUSION JOINT
Filed Sept. 16, 1938  2 Sheets-Sheet 2
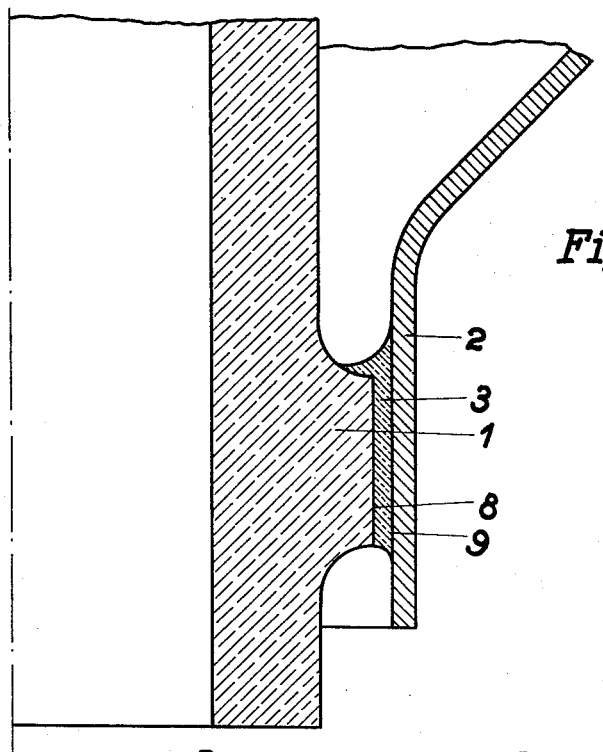
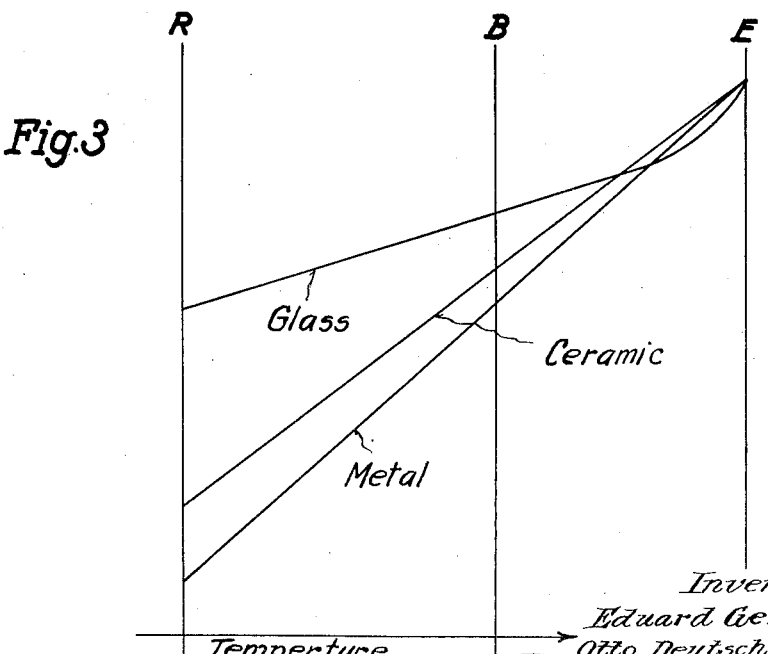
Inventors:
Eduard Gerecke,
Otto Deutschbein,
Werner Schulze,
Attorneys Patented May 14, 1940

2,200,694

UNITED STATES PATENT OFFICE 2,200,694

ANNULAR FUSION JOINT

Eduard Gerecke and Otto Deutschbein, Berlin-Grunewald, and Werner Schulze, Berlin-Wilmersdorf, Germany, assignors to Julius Pintsch Kommanditgesellschaft, Berlin, Germany Application September 16, 1938, Serial No. 230,306
In Germany September 21, 1937

5 Claims. (Cl. 250—27.5)

This invention relates to the formation of vacuum tight joints for electric discharge vessels.

An object of the invention is to produce a joint in which the sealing flux has a lower coefficient of expansion than an insulating member which is joined to a metal member by the flux. A further object of the invention is to produce a joint having a desirable stress distribution in the sealing flux by creating an insulating member having a coefficient of expansion substantially equal to that of the metal member to which it is connected, and joining the members by a flux having a less coefficient of expansion than that of said members.

Another object of the invention is to select such materials for the insulating member, the flux, and the metal member as to ensure a substantially equal coefficient of expansion for the insulating member and the metal member, and a lower coefficient of expansion for the flux over a predetermined temperature range.

A means by which the objects of the invention are obtained is described in the following specification taken in conjunction with the drawings, in which:

Fig. 1 is a cross-sectional view of a lead-in construction for an electric discharge vessel showing the novel joint construction of this invention.

Fig. 2 is an enlarged cross-sectional view of a portion of Fig. 1, and

Fig. 3 is a graph illustrating the relative expansions over a temperature range of the materials used in the joint construction.

The arrangement of an annular fused jointing, to which the present invention relates and which can particularly be used for the vacuum tight current inleads of vacuum discharge apparatus, is shown in Figure 1. 1 is a ceramic tube, to which a sleeve 2 of a special metal is joined by means of a glass or enamel flux 3 in a cylindrical adhering surface. Instead of being perfectly cylindrical the adhering surface can be slightly conical. At the upper end of the ceramic tube 1 is a fusion with a sleeve $2^1$ arranged inside the tube and made of special metal, this fusion again being brought about by the use of a glass or enamel flux between the two parts 1 and $2^1$. The sleeve 2 is in the usual manner welded at 4 onto a vessel part 6 preferably of metal, whilst the sleeve $2^1$ is joined at 5 with a current conductor 7 which is disposed partly inside and partly outside the vessel.

The present invention is concerned with the special choice of the materials used for the annular joint and their coefficients of heat expansion, the materials in question being those forming the ceramic tube 1, the metal sleeve 2 and $2^1$, and the glass or enamel fluxes 3 and $3^1$ respectively.

Hitherto for making such fused joints two different methods have been adopted. One first endeavoured to give to the ceramic part 1, the sleeves 2 and $2^1$ of special metal, and the glass or enamel fluxes 3 and $3^1$ respectively, as near as possible equal coefficients of heat expansion in the temperature range between that at which the flux gives way and that of the room. This method, since one is limited in the choice of materials, has the disadvantage that a glass or enamel flux of proportionally low softening temperature must be used. Furthermore, the glass or enamel flux in the carrying out of this process should ideally be in a nearly tensionless condition, so that, with mechanical stress or non-uniform heating, tensile stresses occur in the flux, against which the flux, as is generally known, has only an insignificant capacity of resistance.

On account of this another method has been adopted, namely: a glass or enamel flux is chosen, which coincides as accurately as possible with the ceramic tube 1 in respect of heat expansion between the softening temperature and the room temperature, and on to this combination of glass or enamel flux and ceramic tube is then so to speak shrunk on a sleeve of special metal with a higher coefficient of heat expansion. This method lends itself only for making such annular joints as have the metal outermost and the ceramic within; moreover, it has the disadvantage that with a cooling to the lowest temperature experienced tensile stresses are set up in the metal, which has as a result a flowing of the metal, so that the annular joint after several heatings and coolings does not remain tight. A further disadvantage found with this arrangement of a metal sleeve shrunk onto the ceramic with a glass or enamel flux interposed, consists in this that, owing to the difference in the heat expansions in the axial direction between the ceramic and the flux on the one hand and the metal sleeve on the other, considerable shearing stresses are set up in the flux, which may lead to the formation of fissures and occurrence of leakage.

The arrangement according to the present invention avoids all these disadvantages. According to the invention, for an annular jointing between a ceramic part and a metal part using a glass or enamel flux and with cylindrical or slightly conical adhering surfaces, the ceramic part as well as the metal part has a higher coefficient of expansion than the glass or enamel flux between the softening temperature of the flux and the room temperature, the ceramic and metal coefficients being preferably nearly equal.

The advantages of this arrangement are as follows: since the ceramic part and the metal both have higher coefficients of expansion, approximately equal to one another, than the glass or enamel flux, so that the last mentioned tends to be displaced equally on its outer as on its inner adhering surface, and is subjected to a pressure equally distributed in all directions. This pressure-stress in the interior of the glass or enamel flux arises not only in the surface elements parallel to the bounding surface of the cylinder, but also practically in all the surface elements which are vertical to the axis of the annular joint. Then since the thickness of the glass or enamel layer in the radial direction is small as compared with its axial length consequently there are very low shearing stresses in the cylindrical adhering surfaces 8 and 9 of Figure 2, in order that practically the same compression-stresses may be brought about in those surface elements which lie perpendicularly to the axis of the annular joint, as in those which are parallel to the bounding surface of the annular joint. The glass or enamel flux is put practically into such a stress condition, as if it were enclosed on all sides by a medium of higher heat expansion. By means of the arrangement in accordance with the invention there is obtained, without inadmissably high stresses of the ceramic part 1, and of the metal from which the sleeve 2 is made, an annular joint which also possesses a very much higher degree of working safety in comparison with the mechanical requirements and disproportionate heating, than is possessed by the socalled safety glass in the stress-less condition of a sheet. It is clear that in the arrangement according to the invention it is now possible without further endeavour to form annular joints such as is shown at the upper end of the ceramic tube 1 in Figure 1 between the parts 1, 2¹, 3¹, in which the ceramic is outside and the metal sleeve within.

The inventive concept here set out, namely in an annular joint between a ceramic part and a metal utilising a glass or enamel flux to submit the flux to a substantially equal pressure on all sides, may be carried out with different materials, by reason of the fact that the metal and ceramic parts both have a coefficient of heat expansion greater than that of the flux.

In one particular embodiment, the ceramic part is formed out of a product that contains magnesium silicate and particularly that which is known as Steatite, of which the coefficient of heat expansion lies between $80.10^{-7}$ and $100.10^{-7}$ especially in the vicinity of $90.10^{-7}$, for the range of from 0° up to 600° C.

As the flux for joining this steatite there may advantageously be used a thermometer glass of a kind suitable for use at high temperatures, and which undergoes but little change through age.

For use as the metal, alloys of iron are suitable, preferably alloys of which the heat expansion follows a substantially linear course between the softening temperature of the flux and the room temperature. Such a characteristic of the heat expansion of the metal can be obtained by various expedients. For example, iron-chromium alloys with more than 15% of chromium content show the desired feature; or instead of these, alloys of nickel and iron can be used, having more than 45% of nickel. Another group of suitable alloys are those of iron-nickel-cobalt, of which the magnetic transformation point lies above the softening temperature of the glass or enamel flux, somewhere in the vicinity of 600°, or preferably more; namely such alloys as, in a temperature range below their magnetic transformation point, present a coefficient of heat expansion between $80.10^{-7}$ and $100.10^{-7}$, preferably between $80.10^{-7}$ and $90.10^{-7}$, especially $85.10^{-7}$. Alloys of this kind have for example an iron content of about 45%, a nickel content of about 20% and a cobalt content of about 35%.

In Figure 3 are shown the expansions with rise of temperature for the ceramic part, the metal, and the glass flux, of an annular joint in accordance with the invention, those expansions being plotted on a common graph, against temperature. Starting from the softening temperature E of the glass, the line indicating the linear coefficient of the glass during cooling shows first of all, over a short temperature interval a steep, but then a very much flatter course; whilst the lines for the metal and the ceramic part are practically linear, with the curve for metal having a somewhat steeper slope than that for the ceramic. The consequence of this is that at the room temperature R a considerable pressure-stress practically equal on all sides must occur in the glass flux. Moreover, this pressure-stress in the glass flux existent at the room temperature, is still present at the working temperature B in the neighbourhood of 200–300° C., so that even with slight ageing of the glass in the entire range of temperature coming into consideration, compressive stresses are maintained in the flux with a great working safety. The glass is advantageously so chosen that the curve for its expansion after ageing of the glass also, lies above the curves for the ceramic and the metal at the working temperature B as well as the room temperature R.

The annular joint is obtained in a manner known per se, as by the use of an electric furnace and a suitable easily oxidising atmosphere. A glass or enamel ring is arranged immediately over the cylindrical or slightly conical adhering surface, and under the influence of gravity and capillarity flows, being in a liquid condition, into the space between the ceramic part and the metal part, sealing it tightly.

Annular joints of the kind proposed by the present invention are of service for the current leads in vacuum vessels for electric discharge in high vacuum or in a special gas or vapour filling, especially for rectifiers with glow-cathodes or mercury cathodes.

What we claim is:

1. The combination of a ceramic part and a metal part, fused together at juxtaposed annular adhering surfaces on the interior of the outer part and the exterior of the inner, by means of a flux, the parts having coefficients of heat expansion greater than that of the flux and substantially equal to one another throughout a temperature range between the softening temperature of the flux and the room temperature.

2. The combination of a ceramic part and a metal part, fused together at juxtaposed annular adhering surfaces on the interior of the outer part and the exterior of the inner, by means of a flux, the parts having substantially equal coefficients of heat expansion greater than that of the flux throughout a temperature range between the softening temperature of the flux and the room temperature and constant throughout this range.

3. A vacuum discharge apparatus having a current inlead consisting of a rod-like part passing through the wall of the vacuum vessel, and sealed thereto in a vacuum-tight manner by means of a flux interposed between juxtaposed annular surfaces, one around the rod-like part and the other around the wall opening, the rod-like part and wall being of materials having substantially equal coefficients of heat expansion greater than that of the flux throughout a temperature range between the softening temperature of the flux and the working temperature of the apparatus.

4. The combination of an inner tube of steatite and an outer sleeve of iron-alloy, fused together at juxtaposed cylindrical adhering surfaces by means of a flux of thermometer glass suitable for high temperatures, the steatite and iron-alloy having coefficients of heat expansion substantially equal to each other and greater than that of the thermometer glass throughout a range from room temperature to the softening temperature of the flux and being constant throughout this range.

5. The combination of an inner tube of steatite and an outer sleeve of an alloy consisting of 45% iron, 35% cobalt, 20% nickel, fused together at juxtaposed cylindrical adhering surfaces by means of a flux of thermometer glass suitable for high temperatures, the steatite and iron-alloy having coefficients of heat expansion substantially equal to each other and greater than that of the thermometer glass throughout a range from room temperature to the softening temperature of the flux and being constant throughout this range.

EDUARD GERECKE.
OTTO DEUTSCHBEIN.
WERNER SCHULZE.